United States Patent [19]

Fitzner

[11] 4,306,536

[45] Dec. 22, 1981

[54] PULSE CONTROLLED SPARK ADVANCE UNIT FOR AN INTERNAL COMBUSTION ENGINE IGNITION SYSTEM

[75] Inventor: Arthur O. Fitzner, Fond du Lac, Wis.

[73] Assignee: Brunswick Corporation, Skokie, Ill.

[21] Appl. No.: 117,668

[22] Filed: Feb. 1, 1980

[51] Int. Cl.³ .............................................. F02P 5/04
[52] U.S. Cl. ................................... 123/602; 123/416; 123/418; 123/149 C
[58] Field of Search ............... 123/414, 415, 416, 418, 123/602, 146.5 A, 417, 420

[56] References Cited

U.S. PATENT DOCUMENTS

| | | | |
|---|---|---|---|
| 3,703,887 | 11/1972 | Panhard | 123/420 |
| 3,874,349 | 4/1975 | Fitzner | 123/602 |
| 3,898,972 | 8/1975 | Haubner | 123/602 |
| 3,923,022 | 12/1975 | Scholl | 123/415 |
| 4,015,564 | 4/1977 | Fitzner | 123/602 |
| 4,075,989 | 2/1978 | Nagasawa | 123/418 |
| 4,111,174 | 9/1978 | Fitzner et al. | 123/602 |
| 4,208,992 | 6/1980 | Polo | 123/415 |
| 4,244,336 | 1/1981 | Fitzner | 123/602 |
| 4,245,591 | 1/1981 | Nishida et al. | 123/416 |

Primary Examiner—Raymond A. Nelli

Attorney, Agent, or Firm—Andrus, Sceales, Starke & Sawall

[57] ABSTRACT

A power unit (79) includes a spark advance unit (80) connected to a solid state ignition system (81) for selectively supplying ignition sparks to operate an internal combustion engine (83). A pulse generator (107) responds to a series of negative polarity half-cycle alternations (96) provided by an alternator winding (20') to provide a first pulse output (110) of a first frequency. A pulse counter (119) counts the pulses of the first pulse output (110) to provide a second pulse output (120) having a second frequency which is an exact fraction of the frequency of the first pulse output (110). A pair of counters (162, 141) selectively accumulate constant frequency pulses from an independent oscillator (127), as selectively controlled by the first and second pulse outputs (110, 120), to establish high and low speed advance points which are inter-related by a fixed numerical ratio. A pair of latch circuits (170, 149) are respectively connected to respond to one of the first and second pulse outputs (110, 120) and to the count status of one of the counters (162, 141) to selectively operate a modifying circuit (203, 180) to provide control signals to the ignition system (81) to provide a rapid spark angle advance at preselected speeds.

11 Claims, 6 Drawing Figures

PULSE CONTROLLED SPARK ADVANCE UNIT FOR AN INTERNAL COMBUSTION ENGINE IGNITION SYSTEM

CROSS REFERENCE TO RELATED APPLICATIONS

A portion of the apparatus and methods disclosed in this application are disclosed and/or claimed in the following concurrently filed applications:

Ser. No. 06/117,666, filed Feb. 1, 1980 in the name of Arthur O. Fitzner and entitled "High Speed Spark Advancer for an Internal Combustion Engine Ignition System".

Ser. No. 06/117,667, filed Feb. 1, 1980 in the name of Arthur O. Fitzner and entitled "External Pulse Controlled Spark Advance Unit For An Internal Combustion Engine".

TECHNICAL FIELD

The invention relates to a spark advance unit for a power unit including an ignition system connected to operate an internal combustion engine.

BACKGROUND ART

One automatic spark timing advance system senses engine speed, such as by monitoring either the negative bias voltage applied to bias controlled rectifier circuitry used to control the spark angle or the high speed alternator winding output, for operating an auxiliary controlled rectifier to conduct opposite polarity pulses from the alternator to trigger the controlled rectifier circuitry to provide an advanced spark angle at higher speeds, such as provided in the application by Arthur O. Fitzner and entitled "Ignition System for Multiple Cylinder Internal Combustion Engines Having Automatic Spark Advance", which issued on Apr. 1, 1975 to U.S. Pat. No. 3,874,349 and is assigned to a common assignee herewith.

The U.S. Pat. No. 3,898,894, which issued on Aug. 12, 1975 and is entitled "Engine Ignition Timing Control", discloses a system for controlling ignition spark timing by modulating the pulse width of a pulse signal to provide ignition timing throughout the varying operating conditions of the engine.

Another system employs a "bucket" type tachometer circuit connected to a pilot trigger capacitor to receive a pulse rate related charging signal to operate a field-effect transistor operating to vary the resistance across a timing stabilizing threshold bias capacitor to reduce the bias voltage for lowering the triggering threshold to automatically advance the spark at idle speeds, such as provided in the application by Arthur O. Fitzner and entitled "Ignition System with Idle Speed Governor Apparatus", which issued on Jan. 4, 1977 to U.S. Pat. No. 4,111,174 and is assigned to a common assignee herewith.

Another prior spark timing advance senses a plurality of pulses provided by the alternator high speed winding during each cycle of the ignition system operation to vary the negative bias voltage which biases the controlled rectifier circuitry to provide an advanced spark angle limited to low speeds and wherein the high speed winding is lightly loaded and provides essentially undistorted signals at such low speeds, such as provided in the application by Arthur O. Fitzner and entitled "Low Speed Limiter Unit for Internal Combustion Engine Ignition Systems", which issued on Jan. 13, 1981 to U.S. Pat. No. 4,244,336 and assigned to a common assignee herewith.

DISCLOSURE OF INVENTION

A spark advance unit is connected to a power unit including a solid state ignition system which selectively supplies ignition sparks to operate an internal combustion engine. A counter is operatively connected to count speed indicative alternations provided by a power unit circuit to provide an output signal to the ignition system in response to a predetermined frequency of alternations to rapidly advance the spark angle at a predetermined speed.

A pulse generator is operatively connected to the power unit circuit to provide a first pulse output of a first frequency in direct response to the speed indicative alternations. The counter is connected to the pulse generator to count the pulses of the first output and to generate a second output pulse for a predetermined number of first output pulses, whereby the frequency of the second output pulses is a fractional part of the frequency of the first output pulses.

A pair of counters selectively accumulate constant frequency pulses from an independent oscillator and are selectively controlled by the first and second output pulses to provide high and low speed advance points which are inter-related through a fixed numerical ratio.

A first circuit provides a first control signal to the ignition system to rapidly advance the spark angle within a predetermined low speed range in response to one counter output. A second circuit provides a second control signal to the ignition system to rapidly advance the spark angle within a predetermined high speed range in response to the other counter output.

Best Mode for Carrying Out the Invention

Figure 2:
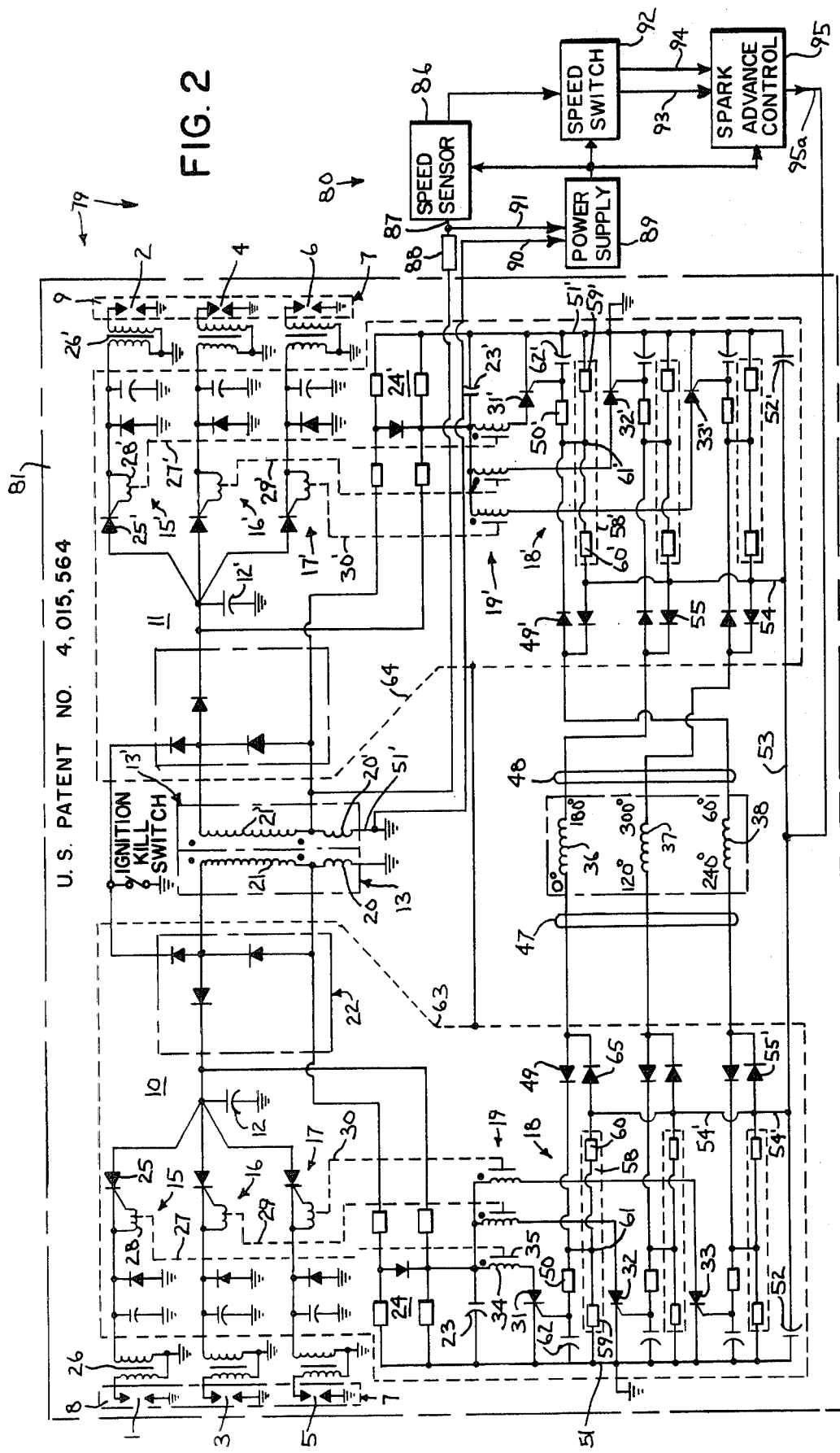
FIG. 2 is a block diagram illustrating a spark advance unit and a schematic circuit showing one type of an alternator driven ignition system for a six cylinder, two cycle high horsepower outboard motor.

A power unit 79 includes a spark advance unit 80 connected to an alternator-driven ignition system 81 to supply ignition pulses to the combustion chambers 82 of an internal combustion engine 83 operating as part of an outboard motor 84. A flywheel type alternator 85 on outboard motor 84 is driven by engine 83 to rotate and generate an output providing both energizing power and timing signals to the ignition system 81. The ignition system 81 may comprise any one of a number of different types of ignition systems. The capacitive discharge ignition system 81 illustrated in FIG. 2 is more fully shown and described in U.S. Pat. No. 4,015,564 issued on Apr. 4, 1977, and assigned to a common assignee herewith. The various components of ignition system 81 are numbered in accordance with the numbering system provided in U.S. Pat. No. 4,015,564.

The spark advance unit 80 includes a speed sensor 86 having an input circuit 87 connected to the high speed winding 20' of alternator section 13' through an input resistor 88. The spark advance unit 80 includes a power supply 89 having an input circuit 90 connected to the system neutral circuit 51' and a second input 91 connected to the alternator winding 20' through the input resistor 88.

A speed switch 92 responds to the output of speed sensor 86 to provide first and second speed responsive outputs at connecting circuits 93 and 94, respectively, to control the operation of a spark advance control 95. Under certain prescribed conditions, as set forth more fully hereinafter, the spark advance control 95 selectively varies the reverse-bias voltage maintained at the biasing capacitors 52 and 52' in the ignition system 81 via the connecting circuit 95a to rapidly change the ignition angle at preselected speeds.

Figure 4:
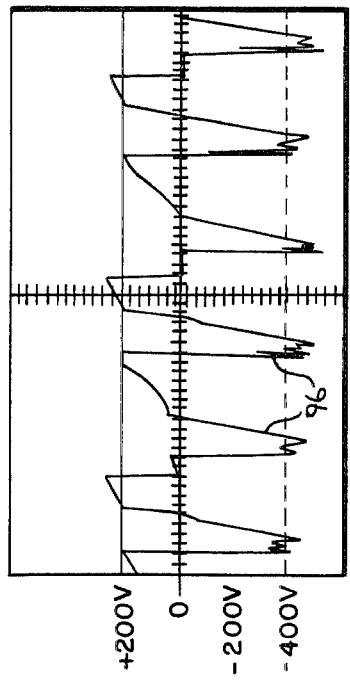
FIG. 4 is a graphical illustration of the wave form sensed at the high speed winding of the alternator illustrated in FIG. 2 at high speeds.

The alternator section 13' is constructed to provide six voltage alternations 96, as illustrated in FIG. 4, for each complete cycle of operation of the ignition system 81. The power supply 89 responds to the negative polarity half-cycles of the alternations 96 to provide operating power to the various circuits of the spark advance unit 80.

Figure 3:
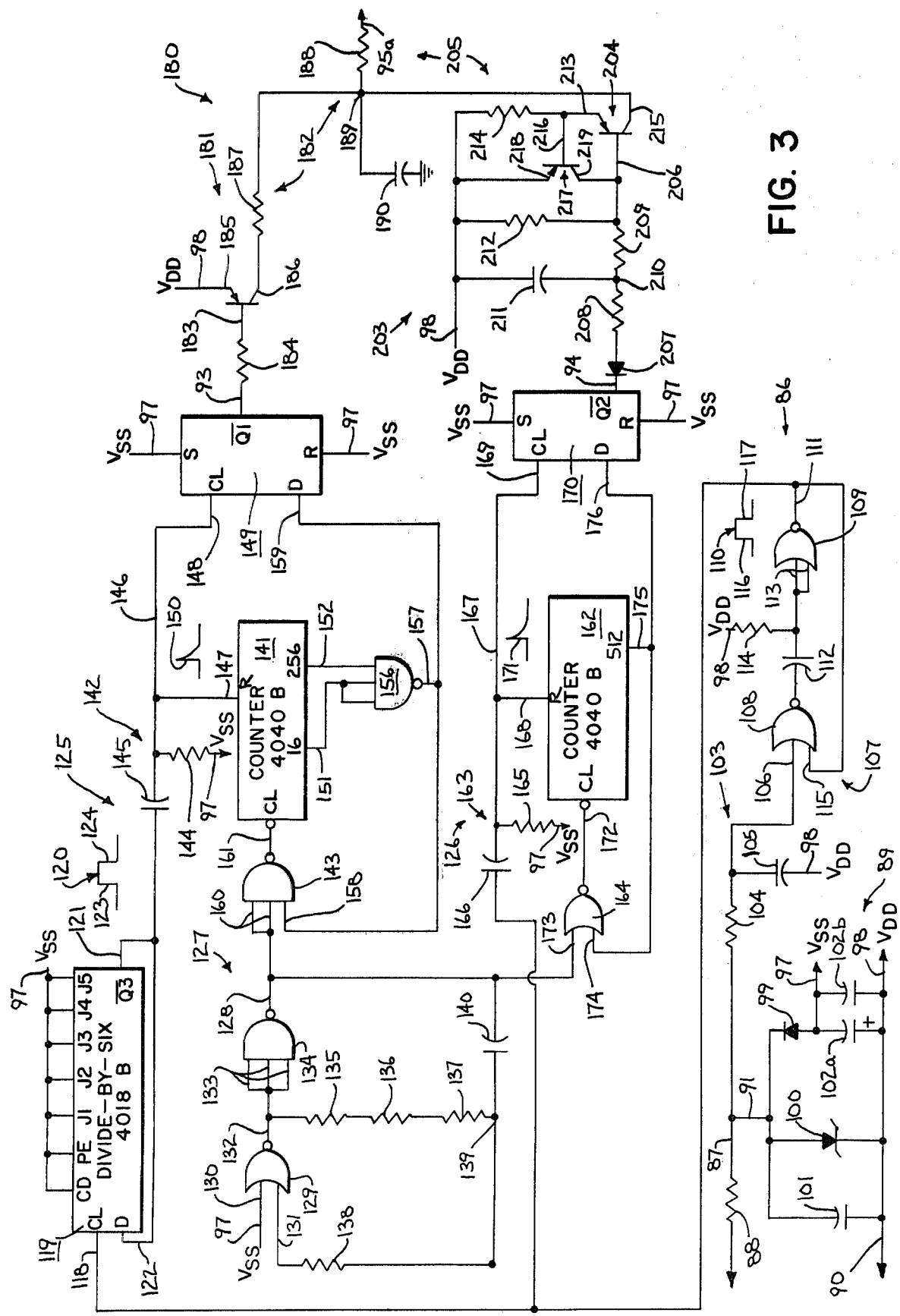
FIG. 3 is a circuit schematic showing the spark advance unit of FIG. 2.

With reference to FIG. 3, the series of alternations 96 supplied through the connecting resistor 88 are rectified and stabilized to provide a negative, substantially constant, D.C. voltage ($V_{SS}$) at a connecting circuit 97. The power supply 89 also provides a connecting circuit 98 joined to the system neutral circuit 90 to supply a system neutral ($V_{DD}$). For logic circuit purposes, the voltage $V_{SS}$ shall be regarded as a logic "0" level while the voltage $V_{DD}$ shall be regarded as a logic "1" level.

The conversion of the alternations 96 into stabilized reference signals capable of functioning with standard logic elements is provided by a rectifying diode 99, a Zener diode 100, and stabilizing capacitors 101, 102a and 102b, with capacitor 101 serving to filter high frequency transients accompanying the alternations 96 which appear at the input of resistor 88, and with capacitors 102a and 102b serving as conventional D.C. power supply ripple filter/energy storage capacitors. The plurality of alternations 96 occurring every engine operating cycle are sufficient to maintain a substantially constant voltage across capacitors 102a and 102b.

The speed sensor 86 provides an additional filter 103 for conducting any residual high frequency transients at input 87 to the system neutral circuit 98 and includes an input resistor 104 and a filtering capacitor 105. Each negative half-cycle 96 which is filtered and which appears at input circuit 87 is supplied by the filtering circuit 103 to an input circuit 106 of a pulse generator 107.

A pair of NOR logic circuits 108 and 109 are interconnected in closed loop configuration to provide a narrow rectangular pulse, such as illustrated by waveform 110, at an output circuit 111 in response to each negative polarity half-cycle of the alternations 96. The NORs 108 and 109 may comprise standard CMOS gates provided by any one of a number of commercially available sources, such as by RCA under the designation CD 4001 BE for example. The specific circuitry of pulse generator 107 is set forth in RCA Application Note ICAN-6267.

The NOR 108 responds to logic "0" signals at both inputs in the presence of a negative half-cycle of alternation 96 to provide a logic "1" signal to a capacitor 112. The capacitor 112 is connected to both inputs 113 of NOR 109 and to the system neutral circuit 98 through a resistor 114. In the presence of a negative half-cycle of alternation 96, inputs 113 are at logic "1" and NOR 109 provides a logic "0" signal to the output circuit 111 and to the input 115 of NOR 108. The disappearance of the negative half-cycle of alternation 96 provides a logic "1" signal to input 106. NOR 108 responds to the logic "1" input to provide a logic "0" signal to capacitor 112, which is coupled to inputs 113 of NOR 109. NOR 109 responds to the logic "0" signal at its inputs 113 to provide a logic "1" signal at output 111. As the capacitor 112 recharges to a magnitude corresponding to a logic "1" level at inputs 113, NOR 109 responds to provide a logic "0" signal at output 111. In such manner, a narrow rectangular pulse 110 having a sharp transition in both forward edge 116 and trailing edge 117 is provided for each negative polarity half-cycle of alternation 96.

The output circuit 111 is connected to a clock input 118 of a divide-by-six counter 119 (frequently referred to as a divider). The divider 119 may comprise any appropriate counting circuit which responds to a predetermined number of pulses 110 at input 118 to selectively provide a logic pulse 120 at an output circuit 121, such as the one marketed by RCA under the designation CD 4018 BE. In the present system there are six pulses 110 for each complete cycle of ignition system operation, so the divider 119 is connected to provide a divide-by-six function requiring six consecutive pulses 110 at input 118 to provide a single logic pulse 120 at output 121. With the counter 119 connected as shown in FIG. 3, the signal on output 121 will remain at the logic "0" level until transition 116 of the third consecutive pulse 110 occurs, at which time the signal on output 121 will become a logic "1" via transition 123. The signal on output 121 will remain at the logic "1" level until three more transitions 116 have occurred, at which time the signal on output 121 will become a logic "0" via transition 124. The signal on output 121 will continue to switch back and forth, making the transfer to the opposite logic polarity on every third transition 116 accompanying the series of pulses 110. The signal on output 121 will thus be of square wave shape, having only one transition 123 for each sequence of six of the transitions 116.

The speed switch 92 includes a high speed section 125 connected to selectively supply an output through the connecting circuit 93 in response to sensed logic pulses 120 provided at output 121 of divider 119 and a low speed section 126 connected to selectively supply an output through the connecting circuit 94 in response to sensed pulses 110 provided at output 111 of pulse generator 107.

A clock oscillator 127 provides an output circuit 128 for supplying continuous constant frequency pulses. The oscillator 127 includes a NOR logic circuit 129 having an input 130 connected to the $V_{SS}$ voltage circuit 97 for receiving a logic "0" signal thereat. NOR 129 also includes a feedback input circuit 131 and an output circuit 132 connected to all three inputs 133 of a NAND logic circuit 134. The output 132 of NOR 129 is also connected to the feedback input circuit 131 through four serially connected resistors 135, 136, 137 and 138. Resistors 135 and 136 constitute fine and coarse tuning resistances, respectively, and are selected to obtain the required frequency of operation of oscillator 127. The output circuit of NAND 134 is also connected to the feedback input circuit 131 through a capacitor 140 and the resistor 138. The common junction of capacitor 140 and resistors 137 and 138 forms node 139.

In operation, oscillator 127 provides continuous oscillations between logic "0" and logic "1" voltage levels at a highly precise, constant frequency. For example, a logic "0" signal at the feedback input 131 will cause NOR 129 to provide a logic "1" signal at output 132 to cause the voltage at node 139 of capacitor 140 to gradually increase in a positive direction. The NAND 134, in turn, will provide a logic "0" signal at output 128. When the charge upon capacitor 140 has increased to the transition level for input 131 of NOR 129, NOR 129 will react to provide a logic "0" at output 132. The NAND 134 will transfer to provide a logic "1" at output 128, and this transfer effect will be coupled via capacitor 140 to node 139. The voltage at node 139 of capacitor 140 will thereafter gradually decrease until the voltage level is at or near the transition level for input 131 of NOR 129, whereat NOR 129 will again transfer state to provide a logic "1" at output 132. The oscillator 127 will continue to oscillate and has been found to provide highly controlled pulses at output 128 with an inherently stable frequency.

The high speed section 125 includes a pulse counter 141 which is connected to the output 121 of divider 119 through a differentiator 142. The counter 141 is also connected to the output 128 of oscillator 127 through a NAND circuit 143. The differentiator 142 includes a serially connected resistor 144 and a capacitor 145 connected between the $V_{SS}$ voltage lead 97 and the output 121 of divider 119. A junction circuit 146 connects the output of differentiator 142, as taken from the connection point between resistor 144 and capacitor 145, to a reset input 147 of counter 141 and to a clock input 148 of a latch 149.

In operation, the differentiator 142 responds to each leading edge 123 of pulse 120 to provide a sharp trigger pulse 150 to be used as a reset input to counter 141 and a clock input to latch 149.

The counter 141 responds to pulse 150 to reset its counting circuits to base zero to initiate a counting sequence. A count 16 decimal output 151 and a count 256 decimal output 152 are connected as inputs to a NAND circuit 156. An output 157 of NAND 156 is connected to an input 158 of NAND 143 and to a data input 159 of latch 149. With counter 141 reset in response to pulse 150, the outputs 151 and 152 are reset to a logic "0" level and NAND 156 maintains a logic "1" signal at output 157. In such state, NAND 143 responds to each logic "1" at its inputs 160 as supplied by oscillator 127 to provide a corresponding logic "0" pulse signal to a clock input 161 of counter 141. Thus when operating in a counting sequence, each transition of oscillator 127 to a logic "1" level provides a clocking signal at input 161 of counter 141. When counter 141 senses 272 pulses at input 161, logic "1" level signals appear at output circuits 151 and 152 so that NAND circuit 156 transfers to provide a logic "0" signal at output 157. Such logic "0" signal is applied to input 158, forcing NAND 143 to maintain a logic "1" signal at the clock input 161 to terminate the counting sequence until the next succeeding pulse 150 is received at the reset input 147. Such logic "0" signal is also applied to the data input 159 of latch 149 and is clocked, that is, captured, by the next succeeding pulse 150 at input 148 to provide a logic "1" signal at output 93.

As the speed of engine 83 increases to be within a predetermined high speed range, the frequency of pulses 120 and hence the pulses 150 increases so that counter 141 is reset before it has completed its timing sequence of accumulating 272 pulses. Thus if the next succeeding pulse 150 occurs before counter 141 has completed its timing sequence, the logic "1" signal appearing at the data input 159 will be clocked by pulse 150 so that latch 149 will provide a logic "0" signal at output 93 indicating an operation of engine 83 within the predetermined high speed range.

A logic "0" signal is thus provided at output 93 by the high speed section 125 in response to the operation of engine 83 within the predetermined high speed range, such as at or above 5500 RPM for example. A logic "1" signal is provided at output 93 by the high speed section 125 in response to the engine 83 operating below the predetermined high speed range.

A low speed section 126 includes a counter 162 which is connected to the output 111 of pulse generator 107 through a differentiator 163. The counter 162 is also connected to the oscillator 127 through a NOR circuit 164. The differentiator includes a serially connected resistor 165 and a capacitor 166 which is connected between the $V_{SS}$ voltage lead 97 and the output 111 of NOR 109. A junction circuit 167 from the output of differentiator 163 is connected to a reset input 168 of counter 162 and to a clock input 169 of a latch 170.

The differentiator 163 responds to the leading edge 116 of each pulse 110 to provide a sharply differentiated pulse 171 which functions to reset counter 162 to initiate each counting sequence and also to clock the latch 170. A clock input 172 of counter 162 is connected to the output of NOR 164. An input 173 of NOR 164 is connected to the output 128 of oscillator 127 while another input 174 is connected to a count 512 decimal output 175 of counter 162. A data input 176 of latch 170 is connected to the count 512 output 175 of counter 162.

In operation, the occurrence of each pulse 171 in response to the rising edge 116 of each pulse 110 resets counter 162 to initiate a new counting sequence. Each transition of the oscillator output 128 to a logic "1" level operatively provides a logic "0" signal to the clock input 172 and is accumulated or counted by counter 162. When counter 162 senses an accumulation of 512 clocking pulses at input 172, the output 175 transfers to a logic "1" signal which is applied to input 174 to force NOR 164 to maintain a constant logic "0" at the clock input 172 to deactivate counter 162. The logic "1" signal at the output 175 is also applied to the data input 176 so that the next succeeding differentiated pulse 171 applied to the clock input 169 will clock latch 170 to provide a logic "0" signal at output 94, indicating that engine 83 is operating within the predetermined low speed range.

When engine 83 increases its speed to be above the predetermined low speed range, each next succeeding pulse 171 occurs during a counting sequence to reset counter 162 before it has an opportunity to accumulate 512 input clock pulses. In such manner, the logic "0" signal appearing at output 175 and at the data input 176 is clocked by the next succeeding differentiated pulse 171 so that latch 170 will provide a logic "1" signal at output 94 indicating that the engine 83 is operating above the predetermined low speed range.

A logic "0" signal is thus provided at output 94 by the low speed section 126 in response to the operation of engine 83 within the predetermined low speed range, such as at or below 495 RPM for example. A logic "1" signal is provided at output 94 by the low speed section 126 in response to the engine 83 operating above the predetermined low speed range.

The counters 141 and 162 may be selected from any one of a number of commercial sources, such as provided by Motorola under the designation MC4040BCP. Likewise, the latches 149 and 170 may be selected from any one of a number of commercial sources, and two such latches may be found in a single integrated circuit chip, such as provided by RCA under the designation CD 4013 BE, for example.

The spark advance control 95 includes a high speed spark advance modifying circuit 180 connected to respond to the logic at output 93 to selectively supply a modifying signal to the ignition system 81 through the connecting circuit 95a. Specifically, the modifying circuit 180 includes a switch 181 and a bias voltage modifying impedance 182. The switch 181 includes a PNP type transistor providing a base circuit 183 connected to the output 93 of the speed switch 92 through a connecting resistor 184. An emitter circuit 185 of transistor 181 is connected to the system neutral circuit 98 while a collector circuit 186 is connected to the output circuit 95a through the modifying impedance 182 including a pair of serially connected resistors 187 and 188. A junction 189 between resistors 187 and 188 is connected to the system neutral through a capacitor 190 to protect the transistor 181 from high voltage high frequency transients.

The spark advance control 95 responds to an operating speed below the predetermined high speed range (but above the predetermined low speed range) to operatively disable the spark advance unit 80 from providing any operative influence upon the ignition system 81. Specifically, a logic "1" signal provided by speed switch 92 at output 93, which indicates an engine operation below the predetermined high speed range, is applied to base circuit 183 to render the transistor 181 turned off, i.e. non-conductive. In such manner, the modifying impedance 182 is operatively disconnected so as not to provide any operative influence on the reverse-bias voltage provided by the capacitors 52 and 52' within the ignition system 81.

On the other hand, the spark advance 95 responds to an operating speed within the predetermined high speed range to condition the ignition system 81 to provide a significant spark advance. In this regard, a logic "0" signal provided by speed switch 92 at output 93, which indicates an engine operation within the predetermined high speed range, is applied to the base circuit 183 to render the transitor 181 turned on, i.e. conductive. In such manner, the modifying impedance 182 is operatively connected to provide a modifying influence upon the reverse-bias voltage retained by capacitors 52 and 52' within the ignition system 81. Thus, an additional circuit connection is completed from the system neutral circuit 98 through the conducting transistor 181, resistors 187 and 188, and the connecting circuit 95a to the negative bias circuit 53 of ignition system 81. With transistor 181 conductive, the reverse bias voltage at circuit 53 is significantly reduced, such as by fifty percent for example, to provide a significant advance in the spark angle.

Figure 5:
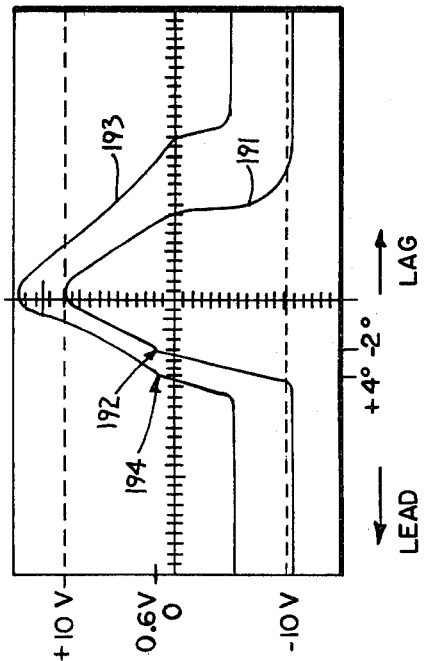
FIG. 5 is a graphical illustration of gating signals employed to actuate a controlled rectifier to provide an ignition spark and having an ordinate representing voltage and an abscissa representing relative ignition angle.

At operating speeds below the predetermined high speed range and above the predetermined low speed range, a gating signal 191 as illustrated in FIG. 5 appears sequentially in the gate circuits of the controlled rectifiers, such as at controlled rectifier 31' for example. The gating signal 191 which appears at 61' for example, constitutes a summation of the gating pulse, such as provided by the alternator winding 38 and directed to the controlled rectifier 31' for example, and the reverse bias voltage provided by the biasing capacitors 52 and 52'. When a predetermined forward voltage drop across the gate to cathode circuit of the controlled rectifier 31' occurs, such as 0.6 volts for example, controlled rectifier 31' is rendered conductive. Such conduction is illustrated in FIG. 5 as occurring at point 192 corresponding to an ignition firing angle of approximately minus two degrees lag ($-2°$), measured in a relative sense. The ignition at point 192 of the gating signal 191 occurs without any influence by the high speed spark advance unit 80 and is referred to as a normal firing angle.

When speed sensor 86 senses an operating speed within the predetermined high speed range, such as above 5500 RPM for example, the speed switch 92 activates the modifying circuit 180 of the spark advance control 95 to operatively connect the resistors 187 and 188 to modify the potential at the reverse bias capacitors 52 and 52'. Under such conditions, a modified gating signal 193 appears sequentially in the gate circuits of the controlled rectifiers. When the voltage of gating signal 193 appearing at 61' reaches a predetermined magnitude, such as 0.6 volts for example, the controlled rectifier 31' is rendered conductive. Such conduction is illustrated in FIG. 5 at point 194 corresponding to an ignition firing angle of approximately four degrees lead ($+4°$) measured in a relative sense which constitutes a significant advance in the spark angle for the ignition system 81.

Figure 6:
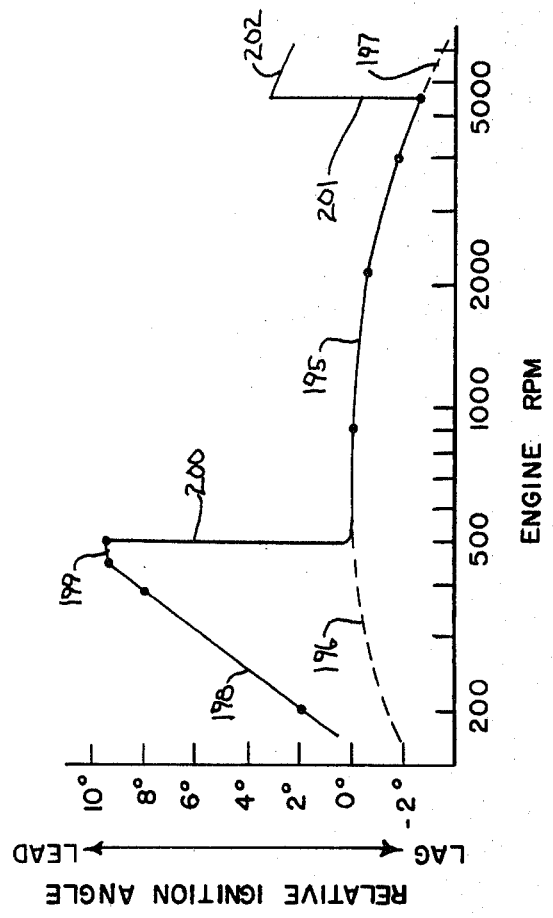
FIG. 6 is a graphical illustration of an electronic timing characteristic and having an ordinate showing the relative ignition angle and an abscissa showing the engine speed in revolutions per minute (RPM).
Figure 1:
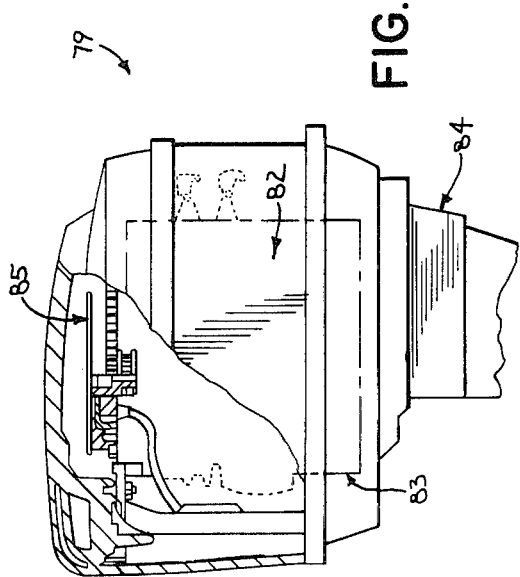
FIG. 1 is a simplified view of an outboard motor for a boat with parts broken away to generally show inner details of construction.

FIG. 6 illustrates the relationship between the relative firing or spark angle as a dependent function of engine speed. It is understood, but not shown in any of the Figures, that the relative firing or spark angle is also dependent upon the actual angular orientation of the alternator windings 36, 37 and 38. The windings 36, 37 and 38 are mounted in a common movable assembly (not illustrated) which when rotated in a direction opposite to the direction of rotation of the flywheel causes the gating signals as illustrated in FIG. 5 to occur earlier in the rotational movement of the engine crankshaft. Rotation of the windings in an opposite direction causes a timing or spark retard.

The circuit of the invention superimposes an advance of the spark angle on the spark angle that would have existed without the invention. FIG. 6 illustrates the electronically superimposed spark advance. The portion of the curve labeled 195 and the dashed extensions thereto labeled 196 and 197 illustrate a relative firing or spark angle characteristic as a function of engine speed that would exist without the invention and without any angular movement of alternator windings 36, 37, 38. The effect of the invention is to change the shape of the characteristic from 196, 195 and 197 to 198, 199, 200, 195, 201 and 202.

When engine 83 operates within the high speed range, such as at or above 5500 RPM for example, the spark advance control 95 is operative to provide a significantly advanced spark angle as illustrated at 202. When engine 83 decreases its operating speed to a speed below the high speed range, the spark advance unit 80 disables its high speed spark advance circuit 180 and the firing or spark angle returns to its normal or customary spark angle as illustrated at 195 in FIG. 6.

The transition between the high speed advanced spark angle 202 for operation within the high speed range to the normal or customary spark angle 195 when the engine speed decreases below the high speed range is significantly rapid to provide a substantially instantaneous transition, as illustrated at 201 in FIG. 6. Thus when the operating speed of engine 83 decreases below the predetermined high speed range, a substantially instantaneous transition 201 occurs and the electronically superimposed spark angle rapidly transfers from an advanced spark angle, such as approximately four degrees for example, to a normal spark angle, such as a minus two degrees for example, in response to the operation of the high speed spark advance circuit 180. If the engine 83 is operating under an overloaded condition or if the power output at wide open throttle decreases such that the engine speed drops below the predetermined high speed range, the spark advance unit 80 rapidly restores the spark angle to the normal operating value, as illustrated at 195 in FIG. 6, to prevent detonation.

At high speeds, the spark advance unit 80 operatively responds to only a single control pulse 120 for each operating cycle of engine 83. The use of only a single control pulse 120 provides an accurate and reliable transition 201. During high speed operations, the alternations 96 provided by the high speed winding 20' become heavily and unevenly loaded to produce six (6) somewhat unevenly spaced negative half cycles during each cycle of operation. The response by the spark advance unit 80 to only a single pulse 120, as provided by divider 119, during each operating cycle of the ignition system 81 provides an accurate and reliable transition, as illustrated at 201, to disable the high speed spark advance when sensed engine speed decreases below the predetermined high speed range thereby preventing detonation.

The spark advance control 95 also includes a low speed spark advance circuit 203 connected to respond to the signal at output 94 to selectively supply a modifying signal to the ignition system 81 through the connecting circuit 95a. Specifically, the modifying circuit 203 includes a switch 204 and a bias voltage modifying impedance 205. The switch 204 includes a PNP type transistor providing a base circuit 206 connected to the output 94 of the speed switch 92 through a diode 207 and two serially connected resistors 208 and 209. A junction 210 between resistors 208 and 209 is connected to the system neutral circuit 98 through a capacitor 211. The base circuit 206 of transistor 204 is also connected to the system neutral circuit 98 through a resistor 212. An emitter circuit 213 of transistor 204 is connected to the system neutral circuit 98 through a resistor 214 while a collector circuit 215 is connected to the output circuit 95a through the junction 189 and resistor 188.

When motor 83 operates at a speed within the predetermined low speed range, a logic "0" signal at output 94 will render transistor 204 turned on, i.e. rendered conductive. When transistor 204 conducts, a modifying circuit is operatively connected to the ignition system 81 to provide a low speed spark advance. Specifically, the modifying impedance 205 including resistors 214 and 188 is operatively connected to provide a modifying influence upon the reverse-bias voltage retained by capacitors 52 and 52' within the ignition system 81. Thus an additional circuit connection is completed from the system neutral circuit 98, resistor 214, conducting transistor 204, resistor 188 and connecting circuit 95a to the negative bias circuit 53 of ignition system 81. With transistor 204 conductive, the reverse bias voltage at circuit 53 is significantly reduced, such as by more than fifty percent for example, to provide a significant advance in the spark angle.

A base circuit 216 of a PNP type transistor 217 is connected to the emitter circuit 213 of transistor 204. The transistor 217 has an emitter circuit 218 connected to the system neutral circuit 98 and a collector circuit 219 connected to the base circuit 206 of transistor 204. The turn on of transistor 204 renders the transistor 217 conductive to provide a current limiting function to prevent damage to transistor 204.

When the speed sensor 86 senses an operating speed within the predetermined low speed range, such as below 495 RPM for example, the speed switch 92 activates the modifying circuit 203 of the spark advance control 95 to operatively connect the resistors 214 and 188 to modify the potential at the reverse bias capacitors 52 and 52'. In such sequence, a modified gating signal appears at the gate terminals of the controlled rectifiers to provide an ignition firing angle advance of approximately nine degrees lead (+9°) which constitutes a significant advance in the spark angle for the ignition system 81.

As illustrated in FIG. 6, the spark advance control 95 is operative to provide a significantly advanced spark angle when operating within the predetermined low speed range, as illustrated at 198 and 199 in FIG. 6. When the engine 83 increases its operating speed to a speed above the predetermined low speed range, the spark advance unit 80 disables its low speed spark advance circuit 203 and the firing or spark angle returns to a normal or customary angle as illustrated by the curve portion labeled 195 in FIG. 6.

At low speeds, the spark advance unit 80 operatively responds to each one of the six (6) control pulses 110 for each operating cycle of engine 83. The use of six pulses provides monitoring information to detect a possible low speed condition six times within each revolution of the flywheel. Thus, after only 1/6 revolution at an excessively low speed, i.e. within the predetermined low speed range, the spark advance control 80 is able to start responding with corrective action.

During low speed operations, the alternations 96 provided by the high speed winding 20' become very lightly loaded and produce six (6) negative half cycles having very even spacings, in contrast to the uneven spacings that exist at high speeds and which are shown in FIG. 4.

The transition between the normal or customary spark angle 195 and the low speed advanced spark angle 199 for operation within the low speed range is sufficiently concentrated to be plotted as a step change 200 in FIG. 6. That is, with only a very small change in speed the full spark advance as illustrated at 200 occurs.

However, while shown as being extremely rapid as a function of speed, the transition 200 is intentionally slowed as a function of time to reduce the roughness of engine idle.

The transition 200 is slowed as a function of time by the combination of diode 207, resistors 208, 209, 212, and capacitor 211. The voltage across resistor 212 builds up rapidly, but not instantaneously, when the engine speed drops within the predetermined low speed range. Conversely, the voltage across resistor 212 returns to zero somewhat less rapidly and again not instantaneously, when the engine speed rises out of the predetermined low speed range. The voltage across resistor 212 furnishes the turn-on drive for transistor 204. Resistor 214 also plays a role, inasmuch as its presence in the emitter circuit 213 of transistor 204 raises significantly the effective base circuit input impedance of transistor 204, thereby reducing the loading effect of the base input circuit 206 on the voltage developed across resistor 212.

Thus when the operating speed of motor 83 decreases to be within the predetermined low speed range, the potential for the full transition 200 occurs and the spark angle rapidly but in measured fashion transfers from a normal spark angle, such as approximately zero degrees (0°) for example, to an advanced spark angle, such as approximately nine degrees lead (+9°) for example, in response to the low speed spark advance circuit 203. The low speed spark advance thus responds to the operation of the engine 83 within the predetermined low speed range to rapidly and significantly advance the spark angle to substantially reduce the possibility of engine stalling at low speeds.

The use of digital counting techniques permits the establishment of highly controlled low speed and high speed advance points which are interrelated by a fixed numerical ratio. Such ratio is provided by the counters 141 and 162 which count or accumulate the constant frequency pulses supplied by high frequency oscillator 127.

In effect, the engine speed is categorized into at least three different speed ranges. This is done by comparing elapsed times between certain points on a speed-related voltage waveform powering the ignition system with reference time periods established by the two binary counters 141 and 162. Because they are driven by the same oscillator 127, the counters provide two stable, independently restartable, reference time periods for establishing a highly regulated and accurate categorization of the engine speed into plural speed ranges. Additional binary counters could be provided to further categorize added speed ranges.

The divider 119 eliminates the scatter in partial revolution elapsed time measurements such as might be caused by voltage waveform distortions which frequently accompany high speed conditions. This is accomplished by combining such partial revolution elapsed times into a single elapsed time measurement representing one full engine revolution.

I claim:

1. A spark advance unit connected to a power unit including a solid state ignition system selectively supplying ignition sparks to initiate combustion in an internal combustion engine and including a circuit providing a series of electrical alternations of nonuniform frequency, comprising
(A) counting means operatively connected to said circuit to count the alternations to repeatedly provide only one pulse in response to a selected number of said alternations to provide a series of said pulses of a uniform frequency at a constant speed of said engine, and
(B) means responding to the frequency of said series of pulses to provide an output to the ignition system to advance the spark angle for any sensed frequency within a predetermined frequency range.

2. The spark advance unit of claim 1, wherein said output means includes means responding to the period of successive pulses to advance the spark when said period is within a predetermined range of magnitudes.

3. A spark advance unit connected to a power unit including a solid state ignition system selectively supplying ignition sparks to initiate combustion in an internal combustion engine, comprising
(A) sensing means operatively connected to the power unit to provide an output indicative of the operating speed of the engine,
(B) means generating a series of pulses, and
(C) means operatively connected to said pulse generating means and to said sensing means to provide an output to the ignition system to advance the spark angle over a predetermined speed range in response to the number of pulses received within a period corresponding to a sensed speed within the predetermined speed range.

4. A spark advance unit connected to a power unit including a solid state ignition system selectively supplying ignition sparks to initiate combustion in an internal combustion engine, comprising
(A) sensing means operatively connected to the power unit to provide an output indicative of the operating speed of the engine,
(B) first means operatively connected to said sensing means and to the ignition system to selectively advance the spark angle in response to a first accumulation of electrical pulses indicative of operation within a first speed range, and
(C) second means operatively connected to said sensing means and to the ignition system to selectively advance the spark angle in response to a second accumulation of electrical pulses indicative of operation within a second speed range different than said first speed range.

5. The spark advance unit of claim 4, wherein said first and second means accumulate electrical pulses supplied from common pulse generating means to provide first and second pulse accumulations scaled to a common reference.

6. A spark advance unit connected to a power unit including a solid state ignition system selectively supplying ignition sparks to operate an internal combustion engine, comprising
(A) means generating a plurality of pulses,
(B) first counter means operatively connected to said pulse generating means to provide a first output in response to a first accumulation of said pulses,
(C) second counter means operatively connected to said pulse generating means to provide a second output in response to a second accumulation of said pulses different than said first accumulation,
(D) sensing means operatively connected to the power unit to provide an output indicative of the operating speed of the engine, and
(E) transfer means operatively connected to said sensing means and to said first and second counter means and to the ignition system to selectively transfer to advance the spark angle in response to said first pulse accumulation corresponding to a first speed or to any speed less than said first speed and to selectively transfer to advance the spark angle in response to said second pulse accumulation corresponding to a second speed or to any speed greater than said second speed where said second speed is greater than said first speed.

7. In a spark advance unit connected to a power unit including a solid state ignition system selectively supplying ignition sparks to initiate combustion in an internal combustion engine with a circuit providing a series of speed indicative alternations comprising means operatively connected to the alternation producing circuit to periodically count the alternations and provide an output signal to the ignition system in response to a predetermined number of alternations corresponding to a predetermined speed to advance the spark angle in a predetermined speed range.

8. In a spark advance unit connected to a power unit including a solid state ignition system selectively supplying ignition sparks to initiate combustion in an internal combustion engine, comprising
(A) pulse generating means operatively connected to the power unit to provide during each cycle of operation of the power unit a first frequency pulse output and a second frequency pulse output indicative of the operating speed of the power unit, and
(B) transfer means operatively connected to said pulse generating means and to the ignition system to selectively transfer to rapidly advance the spark angle in response to said first frequency pulse output dropping below a first predetermined frequency corresponding to a first speed or to selectively transfer to rapidly advance the spark angle in response to said second frequency pulse output rising above a second predetermined frequency corresponding to a second speed different and higher than said first speed.

9. In a spark advance unit connected to a power unit including a solid state ignition system selectively supplying ignition sparks to initiate combustion in an internal combustion engine, comprising
(A) pulse generating means including
  (1) a first pulse generator connected to receive a plurality of speed indicative alternations from the ignition system during each cycle of the power unit operation to provide a first pulse output of a first frequency and
  (2) a second pulse generator operatively connected to respond to said first pulse output of said first pulse generator to provide a second pulse output of a second frequency different than said first frequency, and
(B) transfer means operatively connected to the ignition system and to said pulse generating means and including
  (1) a first circuit connected to operatively respond to said first pulse output to provide a first control signal to the ignition system to rapidly advance the spark angle at or below a first predetermined speed and
  (2) a second circuit connected to operatively respond to said second pulse output to provide a second control signal to the ignition system to rapidly advance the spark angle at or above a second predetermined speed different than said first predetermined speed.

10. In a spark advance unit connected to a power unit including a solid state ignition system selectively supplying ignition sparks to initiate combustion in an internal combustion engine and including an alternator having an output winding providing a series of speed indicative alternations during each alternator operating cycle, comprising
(A) a first pulse generator connected to the alternator winding to provide a first pulse output of a first frequency in response to the speed indicative alternations,
(B) a second pulse generator connected to said first generator to count the pulses of said first output to provide a second pulse output of a second frequency where each said second pulse occurs in response to a predetermined number of said first output pulses,
(C) a first transfer circuit connected to the ignition system and to said first generator to provide a first control signal to the ignition system to rapidly advance the spark angle at a first predetermined speed within a predetermined low speed range in response to said first pulse output, and
(D) a second transfer circuit connected to the ignition system and to said second generator to provide a second control signal to the ignition system to rapidly advance the spark angle at a second predetermined speed within a predetermined high speed range in response to said second pulse output.

11. An internal combustion engine having a combustion chamber cooperating with an ignition system to provide internal combustion to generate a mechanical output, said ignition system comprising:
(A) at least one first switch operatively connecting a first energy source to a chamber,
(B) at least one second switch operatively connecting a second energy source to actuate the first switch,
(C) an alternator operated by the mechanical output to provide speed indicative alternations and connected to provide at least one timing signal to actuate the second switch at a first predetermined time when the timing signal exceeds a reference signal provided a by reference source to actuate the first switch to conduct energy from the first source to the chamber to provide a spark for ignition, and
(D) a spark advance unit connected to the engine to sense speed and to the reference source to vary the reference signal between a first referencing relationship to provide an advanced spark angle and a second referencing relationship to provide a second spark angle susbstantially less than the advanced angle, said spark advance unit including:
  (1) a first pulse generator connected to the alternator to provide a first pulse output of a first frequency in response to the speed indicative alternations,
  (2) a second pulse generator connected to said first generator to count the pulses of said first output to provide a second pulse output of a second frequency wherein each said second output pulse occurs in response to a predetermined number of said first output pulses,
  (3) a first transfer circuit connected to the reference source of the ignition system and to said first generator to provide a first control signal to rapidly advance the spark angle at a first predetermined speed within a predetermined low speed range in response to said first pulse output, and
  (4) a second transfer circuit connected to the reference source of the ignition system and to said second generator to provide a second control signal to rapidly advance the spark angle at a second predetermined speed within a predetermined high speed range in response to said second pulse output.

* * * * *

UNITED STATES PATENT AND TRADEMARK OFFICE
CERTIFICATE OF CORRECTION

PATENT NO. : 4,306,536
DATED : December 22, 1981
INVENTOR(S) : ARTHUR O. FITZNER It is certified that error appears in the above-identified patent and that said Letters Patent are hereby corrected as shown below:

Column 14, Line 36  after "provided" delete ---a---

Signed and Sealed this

Thirteenth Day of July 1982

[SEAL]

Attest:

Attesting Officer

GERALD J. MOSSINGHOFF
Commissioner of Patents and Trademarks